SAMUEL W. O'LAUGHLEN.
Funnels.
No. 127,506. Patented June 4, 1872.
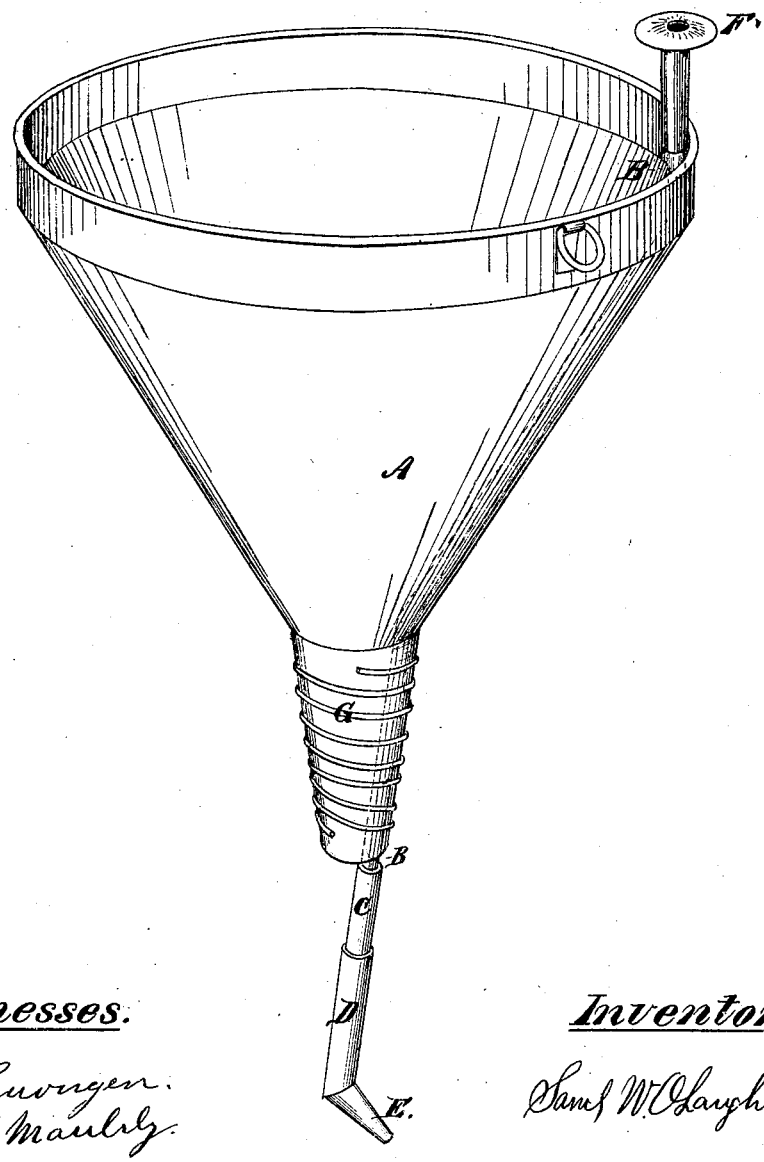
Witnesses.
Inventor

UNITED STATES PATENT OFFICE.

SAMUEL W. O'LAUGHLEN, OF BALTIMORE, MARYLAND.

IMPROVEMENT IN FUNNELS.

Specification forming part of Letters Patent No. 127,506, dated June 4, 1872; antedated May 20, 1872.

I, SAML. W. O'LAUGHLEN, of city of Baltimore, county of Baltimore, State of Maryland, have invented certain Improvements in Funnels, of which the following is a specification:

The object of my invention is to fill and gauge a barrel by means of sliding tubes, so constructed that the barrel can be filled to any measure desired, the measure being indicated by a portable whistle placed upon the top of a tube. The pressure of the air within the barrel upon the tube therein, caused by the falling liquid, causes the whistle to sound until the liquid reaches the end of the tube, when the whistle will cease, thereby indicating the proper amount of liquid within the barrel; also, a screw, to secure the funnel in barrel.

A is the funnel; B, the tube running on inner side through funnel; C D, the slides for gauging the barrel, and may be worked to any point required; E, lower end of tube, so constructed as not to interfere with liquid passing into barrel, yet allowing the air to pass upward, through the tubes without obstruction, to the whistle or indicator F, placed upon the upper end of tube, which indicates the proper amount of liquid within the barrel by continuing the sound until the required amount of liquid be in the barrel, when it will cease to sound. G is the screw by which the funnel is fastened securely to the barrel.

I claim as my invention—

The funnel A, provided with the tube B, whistle F, and sliding tubes C and D, substantially as described.

SAML. W. O'LAUGHLEN.

Witnesses:
GO. BEWING,
A. C. MAULSBY.